United States Patent [19]

Wardell

[11] Patent Number: 4,632,089
[45] Date of Patent: Dec. 30, 1986

[54] WATER CIRCULATED GRILL

[76] Inventor: Lawrence Wardell, 1474 East 6030, Salt Lake City, Utah 84121

[21] Appl. No.: 683,144

[22] Filed: Dec. 18, 1984

[51] Int. Cl.⁴ ............................................. A47J 37/00
[52] U.S. Cl. .................................... 126/25 R; 126/29; 126/9 R; 126/41 R; 126/152 B; 99/450
[58] Field of Search ...................... 126/152 R, 5, 25 R, 126/20, 34, 152 B, 344, 29, 9 B, 9 R, 54, 164, 30, 41 R; 99/450; 108/50, 66; 122/371, 374

[56] References Cited

U.S. PATENT DOCUMENTS

| 70,077 | 10/1867 | Dewey | 126/5 |
|---|---|---|---|
| 1,238,216 | 8/1917 | Thomas, Jr. | 126/29 |
| 1,432,335 | 10/1922 | Howard | 126/34 |
| 1,775,790 | 9/1930 | Tawlks | 126/163 R X |
| 2,570,189 | 10/1951 | Backstrom | 126/5 |
| 3,141,590 | 7/1964 | Anderson | 126/39 M |
| 3,246,644 | 4/1966 | Peterson | 126/9 X |
| 3,472,221 | 10/1969 | Stevens | 126/152 R |

FOREIGN PATENT DOCUMENTS 576921  5/1958  Italy .......................................... 126/5

Primary Examiner—Randall L. Green

[57] ABSTRACT

A water circulated grill having a fire bowl and a food supporting grill thereon the food supporting grill being made up of interconnected tubular members through which water is circulated to maintain the supporting grill surfaces cool while food thereon is heated by a heat source in the fire bowl.

5 Claims, 3 Drawing Figures

WATER CIRCULATED GRILL

BACKGROUND OF THE INVENTION

1. Field of the Invention

This invention relates to the use and maintenance of cooking grills, and is particularly concerned with the cooking and cleaning of said grills.

2. Prior Art

Grills of various types have long been available for the cooking of food. The accumulation of burned food and food residues upon a grill or within a cooking chamber is a recognized problem that others have long tried to correct. U.S. Pat. No. 1,518,811 for an automatic meat broiler recognizes the problem of food residue buildup within a broiler and provides for a water jacket surrounding the heat exhaust of the broiler to heat water to a sufficient temperature to aid in the wash down of the broiler floor into a drain. U.S. Pat. No. 3,800,777 discloses a formed wire grill for a portable cooking unit for outdoor barbequeing with the grill constructed to be selfcleaning by the use of electrical power connected to grill terminals so that the grill is heated to a temperature sufficient to convert food residue thereon to ashes.

Various types of broilers and grills have been developed for use in ovens and ranges that are self-cleaning. In all such units with which I am familar the cleaning means operation occurs as a separate function from a cooking cycle. Generally, such units are merely superheated to burn off collected residue.

BRIEF DESCRIPTION OF THE INVENTION

1. Summary of the Invention

The present invention provides a grill for the cooking of foods through which water is circulated during the cooking cycle. The circulating of water through the grill during the cooking cycle substantially reduces the necessity to clean food or food residues from the grill and increases cooking efficiency using increased heat and steaming action that occurs during cooking.

2. Objects of the Invention

Principle objects of the present invention are to provide a grill on which food is cooked as well as to provide a continuous cleaning action of the grill during the cooking cycle. Another object of the present invention is to efficiently provide for an increased cooking temperature while food is being cooked. Still another object of the invention is to provide for a continuous source of hot water which can be contained for use during the cooking process or for cleanup after cooking.

3. Features of the Invention

Principle features of the invention include a main supply tube which may have valves at both ends to regulate the flow of water therethrough. The main supply tube is connected to auxilary tubes through which the water is also directed. Transversely supporting the auxilary tubes is a central support tube through which water also flows. The main supply tube along with the inner connecting auxilary tubes and the transversely mounted support tube serve as a cooking grill and provide a means for uniform water circulation through the cooking grill. Spaces between the tubes permit heat from a heat source located beneath the grill to food being cooked on the grill. The open space also provides a means whereby food drippings released from the food being cooked can pass through and drip onto the fuel source below the grill, thereby intensifying the heat from the fuel source.

Another feature of the grill is that the grill surface is maintained at a relatively low temperature during the cooking cycle due to the cooling water being continuously circulated through the grill. As food drippings are released from the food cooking on the grill the drippings do not bake to the cooled grill itself but tend to slide off the grill and drop onto the fuel source. Cold water through the grill causes moisture to consense on the grill surface and the condensate then also drips onto the fuel source below the grill. When the condensate hits the fuel source it flashes into steam and is entrained in the rising hot air from the heat source. The steam results in a more intense and penetrating cooking action than is obtained using a dry heat and thereby decreases the cooking time when using the grill of the invention as compared to use of conventional solid wire grills. The steaming action also tenderizes meat and vegetables cooked upon the water circulated grill.

The water passed through the grill during the cooking is heated and can be stored and used as desired for cooking or for cleanup or for such other purposes as may be desired. The final temperature of the water and control of the grill temperature is regulated manually by setting the valves which regulate the flow of water through the grill, the water may be supplied from an independent water source or may be pumped from a reservoir as part of a closed circulating system.

Other objects and features of the invention will become apparent from the following detailed description and drawings, disclosing what is presently contemplated as being the best mode of the invention.

THE DRAWINGS

In the drawings:

FIG. 1, is a perspective view of a water circulated grill of the invention;

FIG. 2, a cross section of the water circulated grill taken on section line 2—2 of FIG. 1 and showing a cross-sectional view of the main supply tubes as well as the transversely mounted supporting tube for auxilary tubes which are shown in longitudinal section; and FIG. 3, a cross-sectional view taken along section line 3—3 of FIG. 1 and showing the main supply tube as well as the auxilary tubes in a cross section and the transversely mounted support tube in longitudinal section.

DETAILED DESCRIPTION OF THE INVENTION

Figure 1:
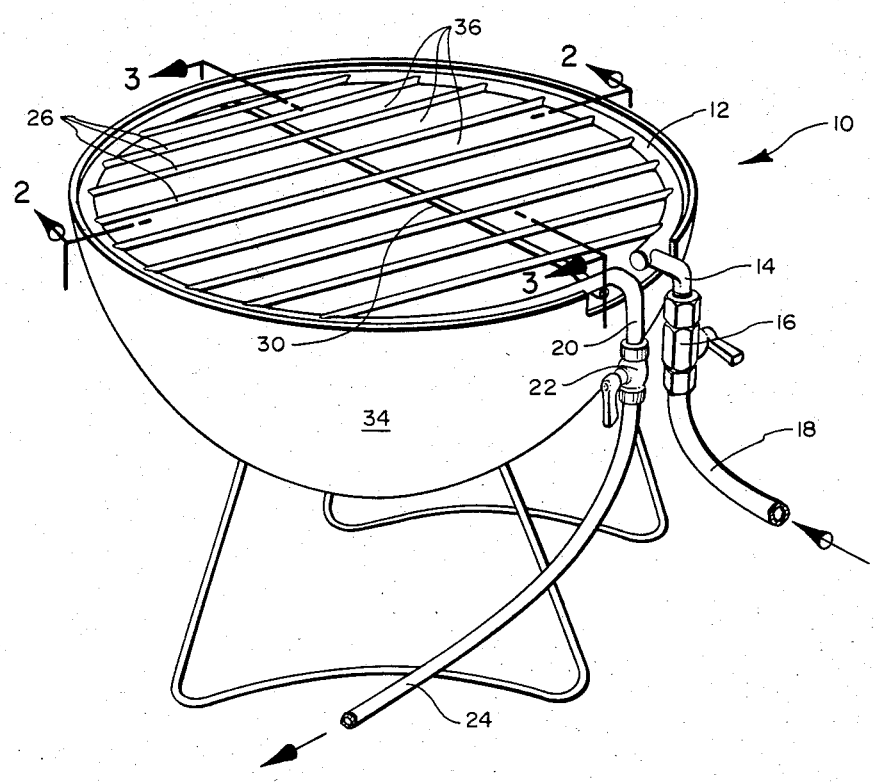
Figure 2:
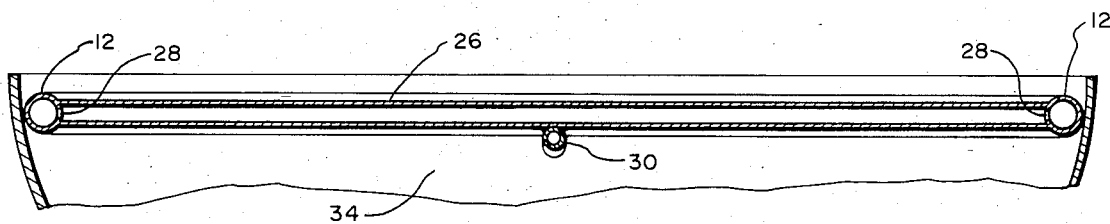
Figure 3:
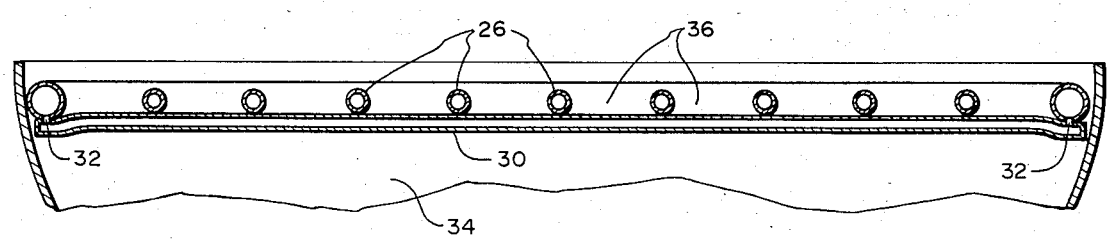

Referring now to the drawings:

In the illustrated preferred embodiment, the grill is shown generally at 10. As shown, the grill has a main supply tube 12, with an incoming end 14 adapted to be connected to a valve 16. Valve 16 is attached to a feeder end 14 of the main supply tube 12 and is connected to a hose 18, which in turn is connected to a water source. While the water source is not shown it will be apparent that it may be any pressurized source, including a culinary water supply or a pump connected to a reservoir. A discharge end 20 of main supply tube 12 is connected to another valve 22 that is attached to a hose 24 used to direct the flow of heated water exiting from the water circulated grill to waste or to a storage container, not shown. The storage container may also constitute a reservoir from which the water is pumped through hose 18 to provide a closed circulating system, with the heated water cooling again in the reservoir.

A shown, the main supply tube is formed in a circular loop, having auxilary tubes 26 spaced intermittently around the inner-side of the loop. The auxilary tubes 26 are positioned to provide flow between port holes 28 that are drilled into the sides of the main supply tube 12 and are welded or otherwise affixed in place. The port holes 28 allow water entering in the inlet side of main supply tube 12 to pass into auxilary tubes 26 and to then be collected at the outlet side of the loop and to be discharged. Likewise the transversely mounted support tube 30 has its opposite ends welded to main supply tube 12, with openings in the tube 12 in alignment with port holes 32 in the tube 12 to interconnect the main supply tube with the support tube and to provide a passageway for water to also flow through the support tube. As the water flows through the auxilary tubes and the support tube from one side of the main supply tube it is then collected on the opposite side of the main supply tube and exits at the outgoing end 20 of the main supply tube 12. Valve 16 can both be regulated to vary the volume of water flowing into the grill and valve 22 can be regulated to regulate the rate of discharge of water from the grill and to thus control the temperature of discharged water.

In use, charcoal or other fuel is placed in a fire bowl 34 and is ignited in conventional manner to produce a source of heat. The water circulated grill 10 at 10 is supported at the top of bowl 34 and the main supply tube 12 is connected through valve 16 to the hose 18. Valves 16 and 22 are adjusted to insure a desired flow of water through tube 12 and the tubes 26a and 30. Heat rising from the heat source below the grill is conducted upwardly and acts to heat the grill, but the heating is countered by water circulating through the tubes 12, 26 and 30.

Food to be cooked is placed on the grill 10 and the heat rising from the charcoal within bowl 34 flows through the spaces between tubes 12, 26 and 30 to heat and cook the food supported thereon. During the cooking processes greases, food particles and the like are released from the food being cooked by the heating action and these either drop directly into the charcoals below or fall onto the grill tubes themselves. As a result of the water cooling of the grill the tubes are not hot and the residues do not bake onto the grill surfaces. The combination of exterior heat and circulating cooler water in the tubes results in condensation forming on the tube surfaces. This condensation also drips into the heat source below. The condensate that drips into the heat source is flashed into steam as it comes in contact with the heat source. The steam then rises to help increase the cooking efficiency of the heat source, and the steam that contacts the tubes, being hotter than the surface temperature of the tubes, once again condenses on the surfaces of the tubes. The process is continually repeated during the cooking cycle, so that a moist heat is available for cooking purposes.

Because of the lower temperature of the tubes making up the grill surface, very little food residue tends to stick to the grill itself during the cooking process. The condensate collecting on the grill surface during the cooking process also reduces the tendency of food drippings to adhere to the tubes. Thus the condensation cycle helps to maintain the grill clean and the grill requires very little further cleanup at the end of the cooking cycle. As notes previously, the water heated during the cooking cycle can, if desired be used for other purposes. Alternatively, the water can be discharged to waste or can be cooled and recycled through the tubes.

Although a preferred form of my invention has been herein disclosed, it is to be understood that the present disclosure is by way of example and that variations are possible without departing from the subject matter coming within the scope of the following claims, which subject matter I regard as my invention.

I claim:

1. A liquid circulated continuously cleaning food cooking grill comprising
   a plurality of food support tubes arranged to form a grill for the support of food items placed directly thereon and for food drippings, water and steam to pass around and between adjacent tubes;
   means interconnecting the interiors of the tubes to permit flow therethrough;
   inlet means adapted to continuously supply cooling liquid under pressure into and through said tubes;
   discharge means to receive liquid circulated through said tubes and to direct it from said grill whereby the liquid is continuously supplied cold to the inlet means and is discharged hot from the discharge means and is continuously flowed through the tubes to maintain the tubes in a sufficiently cooled condition to cause condensation thereon during cooking of food items placed thereon; and
   means supporting a heat source beneath said grill.

2. A liquid circulated grill as in claim 1, wherein
   the means interconnecting comprises a main support tube connected to said inlet means and said discharge means; and wherein said
   plurality of food support tubes each interconnect an inlet side and an outlet side to the main support tube.

3. A liquid circulated grill as in claim 2, further including at least one support tube extending transversely beneath the food support tubes and supporting said food support tubes intermediate their lengths, and interconnecting portions of the main support tube.

4. A liquid circulated grill as in claim 1 wherein the means supporting the heat source comprises
   a firebowl.

5. A liquid circulated, continuously cleaning food cooking grill, comprising a plurality of food support tubes arranged to form a grill for the support of food items placed directly thereon and for food drippings, water and steam to pass around and between adjacent tubes; means interconnecting the interiors of the tubes to permit flow therethrough; inlet means adapted to continuously supply cooling liquid under pressure into and through said tubes; discharge means to receive liquid circulated through said tubes and to direct it from said grill whereby the liquid is continuously supplied cold to the inlet means and is discharged hot from the discharge means and is continuously flowed through the tubes to maintain the tubes in a sufficiently cooled condition to cause condensation thereon during cooking of food items placed thereon, said grill being adapted to be supported over a source of cooking heat.

* * * * *